(12) United States Patent
Blus et al.

(10) Patent No.: US 8,225,455 B1
(45) Date of Patent: Jul. 24, 2012

(54) WINDSHIELD WIPER WASHER APPARATUS

(76) Inventors: Jan Blus, London (CA); Jan Ratajczyk, London (CA)

( * ) Notice: Subject to any disclaimer, the term of this patent is extended or adjusted under 35 U.S.C. 154(b) by 396 days.

(21) Appl. No.: 12/699,314

(22) Filed: Feb. 3, 2010

(51) Int. Cl.
*B60S 1/02* (2006.01)

(52) U.S. Cl. .................... 15/250.04; 15/250.01

(58) Field of Classification Search ........... 15/250.04, 15/250.02, 250.01; 239/284.1, 284.2
See application file for complete search history.

(56) References Cited

U.S. PATENT DOCUMENTS

| | | | |
|---|---|---|---|
| 3,418,676 A | 12/1968 | Byczkowski et al. | |
| 3,716,886 A | 2/1973 | Klomp | |
| 5,065,471 A | 11/1991 | Laplante | |
| 5,383,602 A * | 1/1995 | Edele et al. | 239/284.1 |
| 5,426,814 A | 6/1995 | Minnick | |
| 5,539,951 A | 7/1996 | Guell et al. | |
| 6,470,527 B1 | 10/2002 | Boncoglu | |
| 2008/0263806 A1 * | 10/2008 | Egner-Walter et al. | 15/250.01 |

* cited by examiner

*Primary Examiner* — Basil Katcheves

(57) ABSTRACT

The windshield wiper washer apparatus is provided in a retrofit kit that is fitted to existing wiper assemblies and washer spray outlets of a vehicle. This basic kit provides for attaching hose clamps and tubes to the existing wiper assemblies. A washer spray outlet adapter takes the place of washer sprays of a vehicle. The washer spray outlet adapter fitting connects to hoses that connect to the hose connections of the tubes of the apparatus. Orifices within the tubes can thereby deliver washer fluid directly to the vehicle windshield, immediately adjacent to the wiper blades. The more complete apparatus provides complete wiper assemblies with hose clamps and hoses fitted. Washer fluid from the existing windshield washer assembly is thereby selectively delivered to the vehicle windshield via energizing of the vehicles existing system pump and controls.

2 Claims, 4 Drawing Sheets

WINDSHIELD WIPER WASHER APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

It has become apparent that current windshield washer assemblies of most vehicles do not perform adequately in assisting wiper blades in the cleaning of windshields. A prevalent problem is that current washer assemblies spray water from a nozzle toward the windshield. Slight misalignment of a washer nozzle causes misdirection of sprayed fluid. Additionally, successful spray of a windshield is highly speed dependent, with spray becoming less functional or totally dysfunctional at highway speeds. Further, washer fluid spray typically invades other finished areas of a vehicle and causes spotting and cleanup chores. Spray nozzles distant from a windshield are also less effective in successfully melting ice and snow, as direct contact of fluid to ice and snow is diminished with distant spray devices. The present apparatus provides retrofit kits for improving current windshield washer systems that fit to existing wiper assemblies, and complete wiper assemblies and components for fit to a vehicle.

FIELD OF THE INVENTION

The windshield wiper washer apparatus relates to vehicle windshield wipers and more especially to a wiper assembly that adapts to an existing vehicle to deliver washer fluid directly from each wiper assembly to the vehicle windshield, immediately adjacent to each wiper assembly blade.

SUMMARY OF THE INVENTION

The general purpose of the windshield wiper washer apparatus, described subsequently in greater detail, is to provide a windshield wiper washer apparatus which has many novel features that result in an improved windshield wiper washer apparatus which is not anticipated, rendered obvious, suggested, or even implied by prior art, either alone or in combination thereof.

To attain this, the windshield wiper washer apparatus is provided in a retrofit kit that is fitted to existing wiper assemblies and washer spray outlets of a vehicle. This basic retrofit kit provides for attaching specialized hose clamps and tubes to the existing wiper assemblies. A washer spray outlet adapter takes the place of washer sprays of a vehicle that attempt to target the vehicle windshield from a distance, typically from the hood or the cowl of the vehicle. The washer spray outlet adapter fitting connects to hoses that connect to the hose connections of the tubes of the apparatus. Orifices within each tube can thereby deliver washer fluid directly to the vehicle windshield, immediately adjacent to the wiper blades.

The more complete apparatus provides complete wiper assemblies with hose clamps and tubes fitted. The hose connections of each tube connect, as do those of the more basic apparatus, to the hoses that connect to the fitting of the washer spray outlet adapter. Washer fluid from the existing windshield washer system is thereby selectively delivered to the vehicle windshield via energizing of the vehicles existing system pump and controls.

Thus has been broadly outlined the more important features of the improved windshield wiper washer apparatus so that the detailed description thereof that follows may be better understood and in order that the present contribution to the art may be better appreciated.

An object of the windshield wiper washer apparatus is to spray windshield washing fluid from the wiper assembly.

Another object of the windshield wiper washer apparatus is to avoid spraying parts of a vehicle other than the windshield.

A further object of the windshield wiper washer apparatus is to reduce washer fluid consumption.

An added object of the windshield wiper washer apparatus is to utilize existing wiper blade assemblies.

And, an object of the windshield wiper washer apparatus is to provide a new wiper blade assembly.

Yet another object of the windshield wiper washer apparatus is to improve vehicle safety by more effectively cleaning dirty windshields.

These together with additional objects, features and advantages of the improved windshield wiper washer apparatus will be readily apparent to those of ordinary skill in the art upon reading the following detailed description of presently preferred, but nonetheless illustrative, embodiments of the improved windshield wiper washer apparatus when taken in conjunction with the accompanying drawings.

In this respect, before explaining the current embodiments of the improved windshield wiper washer apparatus in detail, it is to be understood that the windshield wiper washer apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved windshield wiper washer apparatus. It is therefore important that the claims be regarded as including such equivalent constructions insofar as they do not depart from the spirit and scope of the windshield wiper washer apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the windshield wiper washer apparatus generally designated by the reference number 10 will be described.

Figure 5:
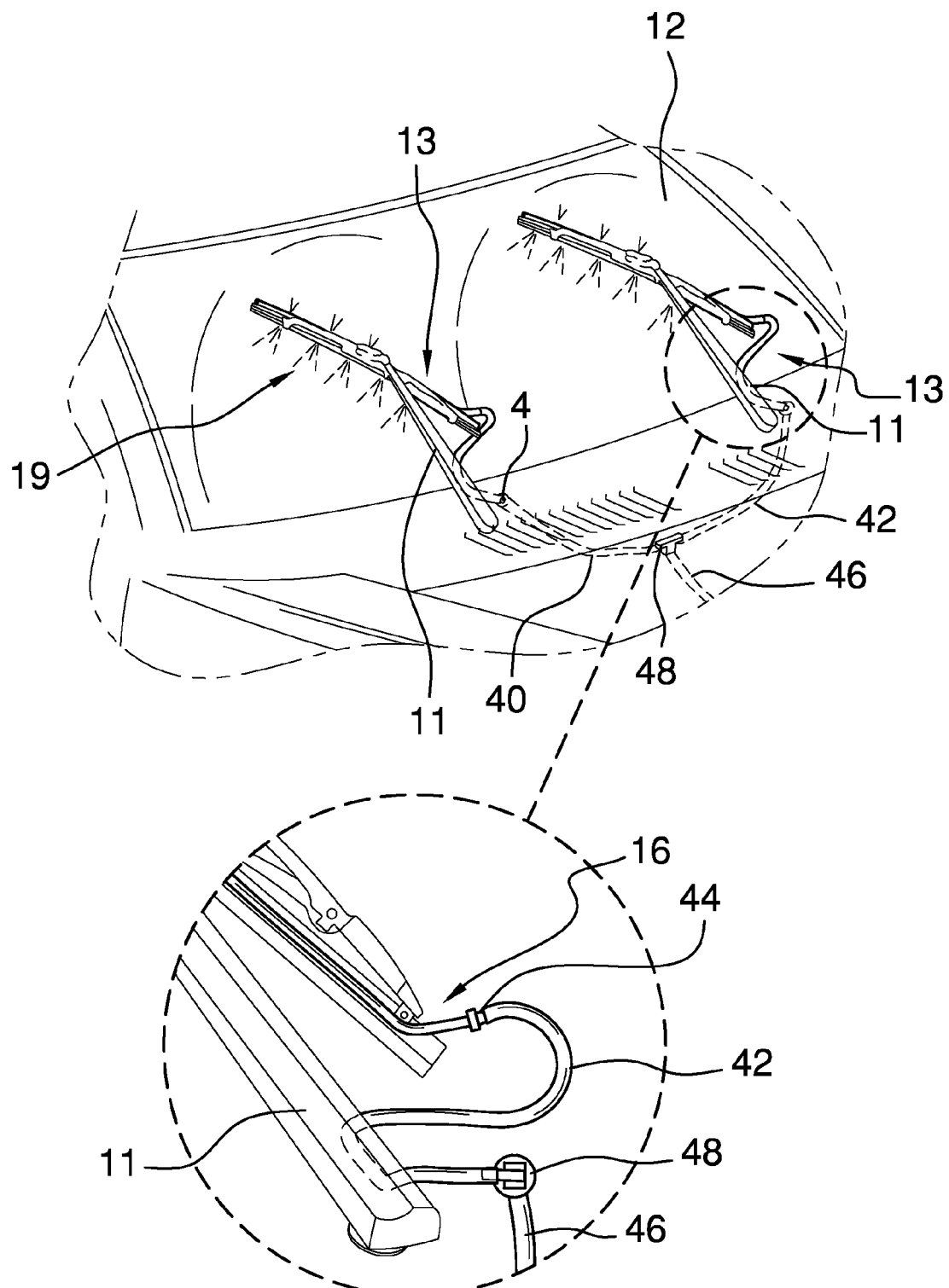
FIG. 5 is a perspective view of the apparatus in use on a windshield, with detail of tube connections.

Referring to FIG. 5, the apparatus 10 partially comprises the pair of wiper assemblies 13 removably affixed to a pair of existing wiper arms 11 of a vehicle. The fitting 48 is connected to the existing windshield washer system 46 of a vehicle. The pair of identical flexible hoses comprises the first hose 40 and the second hose 42. Each hose is attached to the fitting 48.

Figure 1:
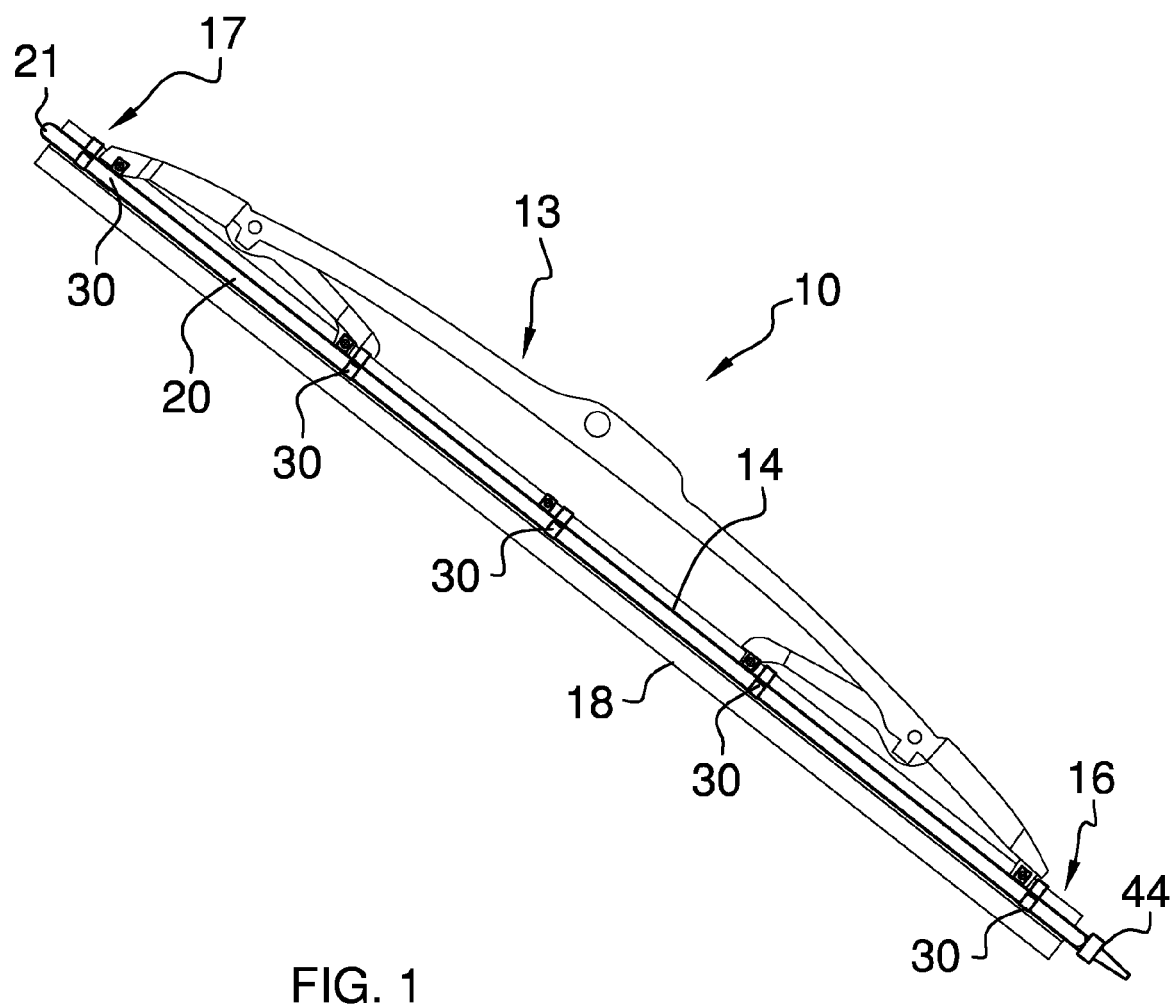
FIG. 1 is a perspective view of one complete wiper assembly.
Figure 2:
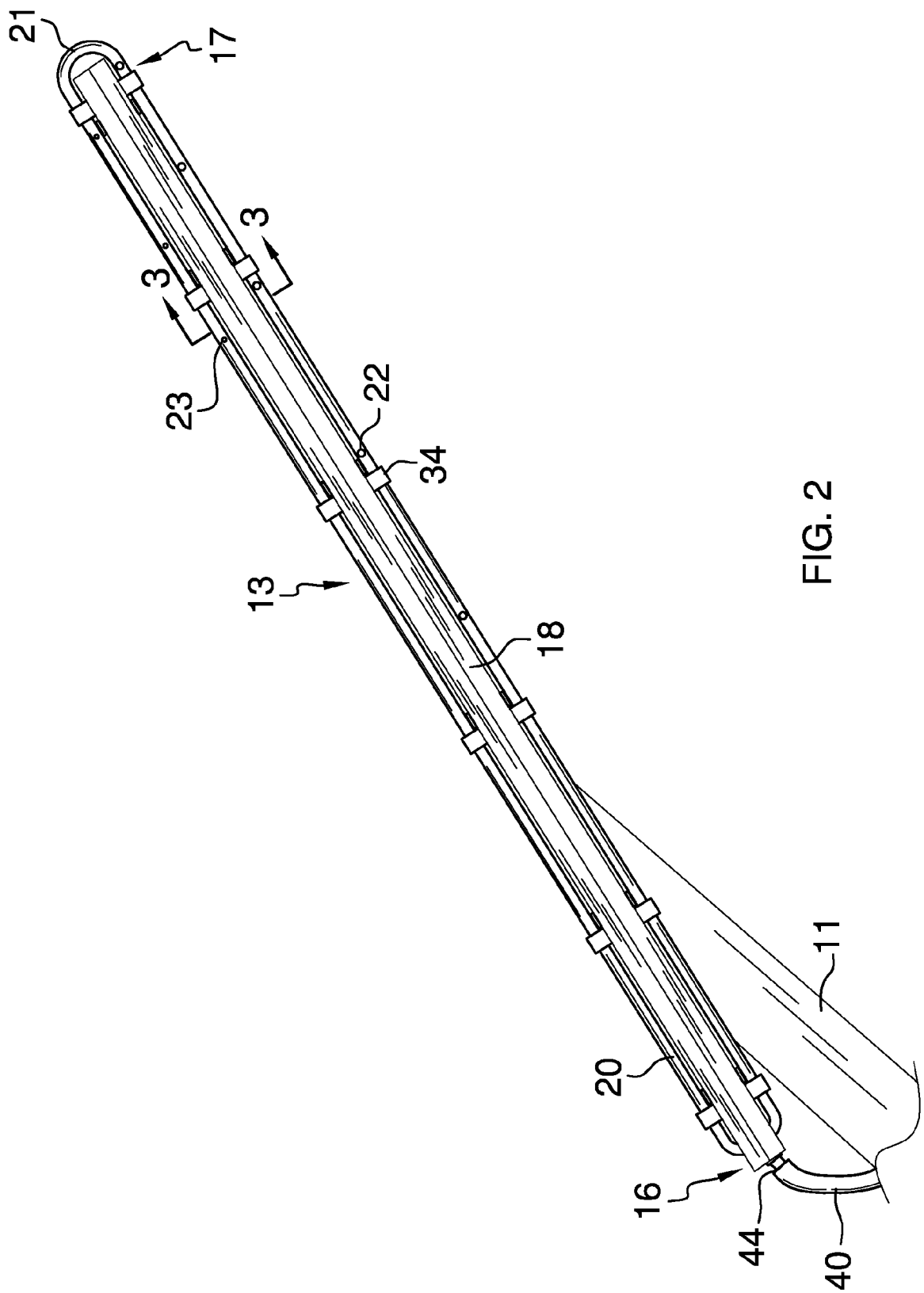
FIG. 2 is a bottom plan view of one wiper assembly.
Figure 4:
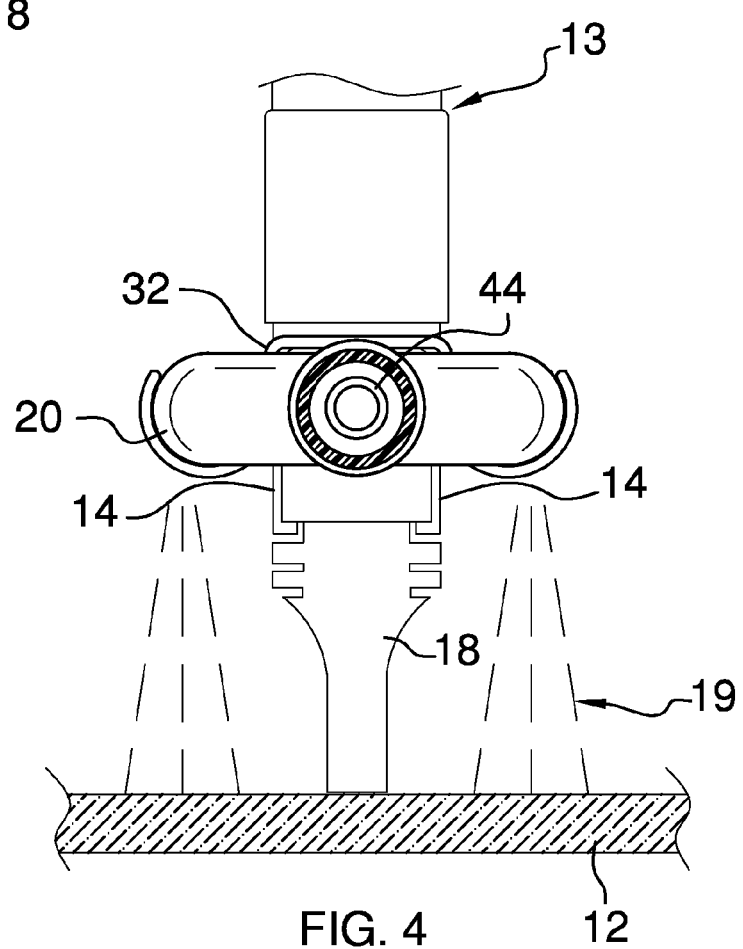
FIG. 4 is an end elevation view of one wiper assembly.

Referring to FIGS. 1, 2 and 4, the plurality of hose clamps 30 is affixed to a side rail 14 of each of the pair of wiper assemblies 13. Each tube 20 further comprises a closed end 21. The tubes 20 are disposed on each side of the wiper assemblies 13. Each wiper assembly 13 further comprises a first end 16 spaced apart from a second end 17.

Figure 3:
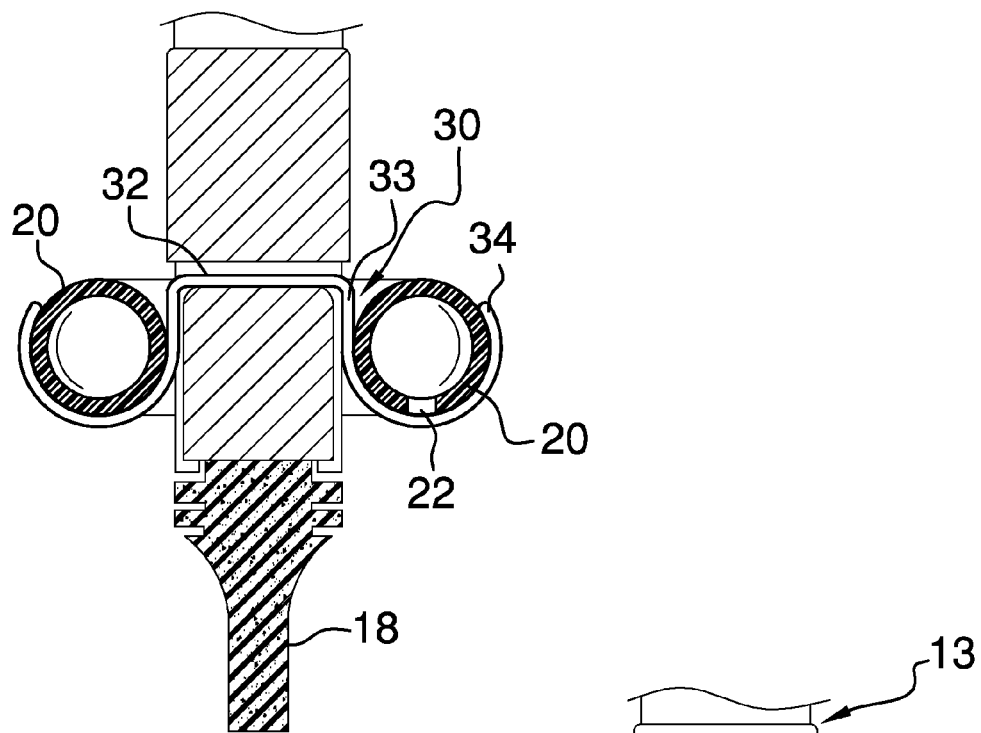
FIG. 3 is a cross sectional view of FIG. 2, taken along the line 3-3.

Referring to FIG. 3, each hose clamp 30 further comprises the flat flange 32 having a self tapping fastener 36 disposed through the flange 32. The fastener 36 fastens the hose clamps 30 to the side rails 14 of each wiper assembly 13. Each riser 33 extends perpendicularly upward from the flat flange 32. The semicircular loop 34 extends outwardly from each riser 33. The loop 34 comprises approximately 200 degrees of a circle. The tube 20 is secured within the semicircular loops 34 of the hose clamps 30 of each windshield wiper assembly 13.

Referring to FIG. 2, the plurality of orifices 22 is disposed downwardly in the tubes 20. The orifices on one side of each wiper assembly 13 are small orifices 23. The orifices on the opposite side of each wiper assembly 13 comprise large orifices 22. The 200 degree loop 34 importantly ensures retention of the tubes 20 to the wiper assemblies 13 while at the same time providing adequate clearance for proper washer fluid 19 outlet from the tube 20 orifices.

Referring again to FIGS. 1, 2, and 5, the hose connection 44 is disposed on an end of each tube 20 opposite the closed end 21. The first hose 40 is fitted to the hose connection 44 of one of the wiper assembly 13 pair. The second hose 42 is fitted to the hose connection 44 of another of the wiper assembly 13 pair. Each tube 20 delivers washer fluid 19 directly to the windshield 12 of the vehicle, immediately adjacent to the flexible blade 18 within each wiper assembly 13. Other than the fitted washer fluid delivery components of the apparatus 10, the wiper assemblies 13 are typical of those presently used by many vehicles. The apparatus 10 is available both as a kit to be fitted to such existing wiper assemblies 13 and also as a complete wiper assembly 13 with hoses and washer spray outlet adapter 46.

With respect to the above description then, it is to be realized that the optimum dimensional relationships for the parts of the windshield wiper washer apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the windshield wiper washer apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the windshield wiper washer apparatus may be used.

Therefore, the foregoing is considered as illustrative only of the principles of the windshield wiper washer apparatus. Further, since numerous modifications and changes will readily occur to those skilled in the art, it is not desired to limit the windshield wiper washer apparatus to the exact construction and operation shown and described, and accordingly, all suitable modifications and equivalents may be resorted to, falling within the scope of the windshield wiper washer apparatus.

What is claimed is:

1. A windshield wiper washer apparatus comprising, in combination:
    a fitting selectively connected to an existing windshield washer system;
    a pair of identical flexible hoses comprising a first hose and a second hose, each hose attached to the fitting;
    a plurality of hose clamps affixed to an existing side rail of each of a pair of an existing windshield wiper assemblies of a vehicle, the wiper assemblies having a first end spaced apart from a second end, the hose clamps affixed to an each side of opposite sides of the wiper assemblies, each hose clamp further comprising:
        a flat flange having a self tapping fastener disposed through the flange, the fastener fastening the hose clamps to the side rails;
        a riser extended perpendicularly upward from the flat flange;
        a semicircular loop extended outwardly from the riser, the loop comprising approximately 200 degrees of a circle;
    a tube secured within the semicircular loops of the hose clamps of each of the pair of wiper assemblies, the tube on each side of the opposite sides of the wiper assemblies;
    a closed end on each tube, the closed end disposed on the wiper assemblies second end;
    a plurality of orifices disposed downwardly in the tubes, the orifices comprising a plurality of small orifices on one wiper assembly side and a plurality of large orifices on the opposite wiper assembly side;
    a hose connection disposed on the tube of the wiper assemblies first end, the first hose fitted to the hose connection of one of the wiper assembly pair, the second hose fitted to the hose connection of another of the wiper assembly pair;
    whereby each tube delivers a washer fluid directly to a windshield of the vehicle, immediately adjacent to a flexible blade within each wiper assembly.

2. A windshield wiper washer apparatus comprising, in combination:
    a pair of wiper assemblies removably affixed to a pair of existing wiper arms of a vehicle, the wiper assemblies having a first end spaced apart from a second end;
    a fitting, the fitting affixed to an existing windshield washer system of a vehicle;
    a pair of identical flexible hoses comprising a first hose and a second hose, each hose attached to the fitting;
    a plurality of hose clamps affixed to a side rail of each of the pair of wiper assemblies, the hose clamps affixed to an each side of opposite sides of the wiper assemblies, each hose clamp further comprising:
        a flat flange having a self tapping fastener disposed through the flange, the fastener fastening the hose clamps to the side rails;
        a riser extended perpendicularly upward from the flat flange;
        a semicircular loop extended outwardly from the riser, the loop comprising approximately 200 degrees of a circle;
    a tube secured within the semicircular loops of the hose clamps of each of the pair of wiper assemblies, the tube on each side of the opposite sides of the wiper assemblies;

a closed end disposed on each tube, the closed end disposed on the wiper assemblies second end;

a plurality of orifices disposed downwardly in the tubes, the orifices comprising a plurality of small orifices on one wiper assembly side and a plurality of large orifices on the opposite wiper assembly side;

a hose connection disposed on the wiper assemblies first end, the first hose fitted to the hose connection of one of the wiper assembly pair, the second hose fitted to the hose connection of another of the wiper assembly pair;

whereby each tube delivers a washer fluid directly to a windshield of the vehicle, immediately adjacent to a flexible blade within each wiper assembly.

* * * * *